US008509442B2

(12) United States Patent
Gavette

(10) Patent No.: US 8,509,442 B2
(45) Date of Patent: Aug. 13, 2013

(54) ASSOCIATION, AUTHENTICATION, AND SECURITY IN A NETWORK

(75) Inventor: Sherman L. Gavette, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 906 days.

(21) Appl. No.: 11/388,869

(22) Filed: Mar. 24, 2006

(65) Prior Publication Data
US 2007/0195956 A1    Aug. 23, 2007

Related U.S. Application Data

(60) Provisional application No. 60/703,382, filed on Jul. 27, 2005.

(51) Int. Cl.
H04L 29/06 (2006.01)
(52) U.S. Cl.
USPC .......................................................... 380/277
(58) Field of Classification Search
USPC .......................................................... 380/277
See application file for complete search history.

(56) References Cited

U.S. PATENT DOCUMENTS

| | | | | |
|---|---|---|---|---|
| 4,977,593 A | * | 12/1990 | Ballance | 380/2 |
| 5,142,578 A | * | 8/1992 | Matyas et al. | 380/280 |
| 5,185,796 A | * | 2/1993 | Wilson | 380/277 |
| 5,204,903 A | * | 4/1993 | Okada et al. | 380/46 |
| 5,377,192 A | * | 12/1994 | Goodings et al. | 370/348 |
| 5,541,924 A | * | 7/1996 | Tran et al. | 370/347 |
| 5,577,024 A | * | 11/1996 | Malkamaki et al. | 370/335 |
| 5,787,483 A | * | 7/1998 | Jam et al. | 711/158 |
| 5,887,063 A | | 3/1999 | Varadharajan et al. | |
| 5,987,331 A | | 11/1999 | Grube et al. | |
| 6,097,817 A | * | 8/2000 | Bilgic et al. | 380/270 |
| 6,463,047 B1 | * | 10/2002 | Cui et al. | 370/337 |
| 6,526,581 B1 | | 2/2003 | Edson | |
| 6,559,757 B1 | | 5/2003 | Deller et al. | |
| 6,587,453 B1 | | 7/2003 | Romans et al. | |
| 6,594,268 B1 | | 7/2003 | Aukia et al. | |
| 6,759,946 B2 | | 7/2004 | Sahinoglu et al. | |
| 6,775,280 B1 | | 8/2004 | Ma et al. | |
| 6,782,476 B1 | | 8/2004 | Ishibashi | |

(Continued)

FOREIGN PATENT DOCUMENTS

| | | |
|---|---|---|
| EP | 0 844 563 B1 | 1/2003 |
| EP | 1 693 998 A1 | 8/2006 |

(Continued)

OTHER PUBLICATIONS

Schneier, "Applied Cryptography", 1996, John Wiley & Sons, Second Edition, pp. 34-38 and pp. 513-520.*

(Continued)

*Primary Examiner* — Edan Orgad
*Assistant Examiner* — Brian Olion
(74) *Attorney, Agent, or Firm* — Brooks Acorida IP Law, PC; Pejman Yedidsion; David Ripma

(57) ABSTRACT

Methods, devices, and systems are provided facilitating security within a network managed by a central coordinator. In some embodiments, the exchange of security keys is performed within one or more time slots that are defined by the central coordinator and known to stations exchanging these security keys. Furthermore, security, e.g., association may be initiated by one user action.

33 Claims, 8 Drawing Sheets

(56) References Cited

U.S. PATENT DOCUMENTS

| | | | |
|---|---|---|---|
| 6,807,146 | B1 | 10/2004 | McFarland |
| 6,901,064 | B2 | 5/2005 | Cain et al. |
| 6,934,249 | B1 | 8/2005 | Bertin et al. |
| 7,200,147 | B2 | 4/2007 | Shin et al. |
| 7,212,513 | B2 | 5/2007 | Gassho et al. |
| 7,233,804 | B2 | 6/2007 | Sugaya et al. |
| 7,242,932 | B2 | 7/2007 | Wheeler et al. |
| 7,330,457 | B2 | 2/2008 | Panwar et al. |
| 7,339,457 | B2 | 3/2008 | Trochesset |
| 7,342,896 | B2 | 3/2008 | Ayyagari |
| 7,356,010 | B2 | 4/2008 | He et al. |
| 7,496,078 | B2 | 2/2009 | Rahman |
| 7,506,042 | B2 | 3/2009 | Ayyagari |
| 2001/0048692 | A1 | 12/2001 | Karner |
| 2002/0116342 | A1 | 8/2002 | Hirano et al. |
| 2002/0150249 | A1* | 10/2002 | Ohkita et al. .............. 380/270 |
| 2002/0163933 | A1 | 11/2002 | Benveniste |
| 2003/0038710 | A1 | 2/2003 | Manis et al. |
| 2003/0039257 | A1 | 2/2003 | Manis et al. |
| 2003/0051146 | A1 | 3/2003 | Ebina et al. |
| 2003/0056014 | A1 | 3/2003 | Verberkt et al. |
| 2003/0066082 | A1 | 4/2003 | Kliger et al. |
| 2003/0198246 | A1 | 10/2003 | Lifshitz et al. |
| 2003/0203716 | A1 | 10/2003 | Takahashi et al. |
| 2003/0231607 | A1 | 12/2003 | Scanlon et al. |
| 2004/0013135 | A1 | 1/2004 | Haddad |
| 2004/0028062 | A1 | 2/2004 | Pirhonen et al. |
| 2004/0066783 | A1 | 4/2004 | Ayyagari |
| 2004/0075535 | A1 | 4/2004 | Propp et al. |
| 2004/0077345 | A1 | 4/2004 | Turner et al. |
| 2004/0165728 | A1 | 8/2004 | Crane et al. |
| 2004/0174829 | A1 | 9/2004 | Ayyagari |
| 2004/0214570 | A1 | 10/2004 | Zhang et al. |
| 2004/0253996 | A1* | 12/2004 | Chen et al. .............. 455/574 |
| 2005/0015805 | A1 | 1/2005 | Iwamura |
| 2005/0033960 | A1 | 2/2005 | Vialen et al. |
| 2005/0041673 | A1 | 2/2005 | Jiang et al. |
| 2005/0076212 | A1* | 4/2005 | Mishina et al. .............. 713/168 |
| 2005/0089058 | A1* | 4/2005 | Hong et al. .............. 370/445 |
| 2005/0124293 | A1 | 6/2005 | Alicherry et al. |
| 2005/0149757 | A1* | 7/2005 | Corbett et al. .............. 713/201 |
| 2005/0169222 | A1 | 8/2005 | Ayyagari et al. |
| 2005/0170835 | A1 | 8/2005 | Ayyagari et al. |
| 2005/0174950 | A1 | 8/2005 | Ayyagari |
| 2005/0193116 | A1 | 9/2005 | Ayyagari et al. |
| 2005/0243765 | A1 | 11/2005 | Schrader et al. |
| 2006/0007907 | A1 | 1/2006 | Shao et al. |
| 2006/0031477 | A1 | 2/2006 | Ayyagari |
| 2009/0238153 | A1 | 9/2009 | Sim |

FOREIGN PATENT DOCUMENTS

| | | |
|---|---|---|
| WO | WO 03/015291 A2 | 2/2003 |
| WO | WO 03/026224 A1 | 3/2003 |
| WO | WO 2005/062546 A1 | 7/2005 |

OTHER PUBLICATIONS

Schneier, Applied Cryptography, Wiley and Sons, Second Edition, pp. 173, 515.*
Schneier, "Applied Cryptography", 1996, Wiley and Sons, pp. 170-187 and 31-32, 37, 49.*
Schneier, "Applied Cryptography", 1996, 2nd Edition pp. 48-49.*
Schneier, Applied Cryptography, Wiley and Sons, Second Edition, pp. 173, 515 1996.*
Schneier, Applied Cryptography, Wiley and Sons, Second Edition, pp. 31-32, 37, 49, and 170-187, 1996.*
David Ruiz et al., "In-Home AV PLC MAC with Neighboring Networks Support," IEEE, 2005, p. 17, rt. hand column, line 14-p. 20,rt. hand column, line 16; and Figs. 2,3,& 6.
Ayyagari, Deepak,"High Speed Home Networking for AV and IP Applications using existing Powerline Infrastructure,"Dec. 2004,p. 65-72,paras:[0001]&[0004],Sharp Technical Journal.
Notice of Allowance for U.S. Appl. No. 11/388,873 dated Dec. 14, 2009.
Final Office Action for U.S. Appl. No. 11/421,155 dated Aug. 12, 2009.
Advisory Action for U.S. Appl. No. 11/388,584 dated Mar. 22, 2010.
Final Office Action for U.S. Appl. No. 11/388,584 dated Jan. 7, 2009.
Notice of Pre-Appeal Brief Review for U.S. Appl. No. 11/388,584 dated Jun. 16, 2010.
Notice of Allowance U.S. Appl. No. 11/420,945 dated Feb. 5, 2010.
Non-Final Office Action for U.S. Appl. No. 11/420,945 dated Jan. 29, 2009.
Final Office Action for Serial No. 11/420,432 dated Nov. 23, 2009.
Non-Final Office Action for Serial No, 11/421,155 dated Feb. 23, 2009.
Non-Final Office Action for U.S. Appl. No. 11/420,432 dated Apr. 28, 2009.
Final Office Action for U.S. Appl. No. 11/388,584 dated Jan. 13, 2010.
Non-Final Office Action for U.S. Appl. No. 11/421,155 dated Mar. 2, 2010.
Non-Final Office Action for U.S. Appl. No. 11/420,432 dated Mar. 25, 2010.
Non-Final Office Action for U.S. Appl. No. 11/388,873 dated Jun. 12, 2009.
Final Office Action for U.S. Appl. No. 11/420,432 dated Aug. 31, 2010.
Non-Final Office Action for U.S. Appl. No. 11/388,584 dated Jun. 25, 2009.
Non-Final Office Action for U.S. Appl. No. 11/388,584 dated Oct. 6, 2008.
Notice of Allowance for U.S. Appl. No. 11/421,155 dated Aug. 5, 2010.
Notice of Allowance for U.S. Appl. No. 12/728,040 dated Aug. 23, 2010.
Non-Final Office Action for U.S. Appl. No. 11/420,545 dated Jul. 8, 2009.
Notice of Allowance for U.S. Appl. No. 11/388,584, mailed May 23, 2011.

* cited by examiner

ASSOCIATION, AUTHENTICATION, AND SECURITY IN A NETWORK

CROSS-REFERENCE TO RELATED APPLICATIONS

This application claims the benefit of U.S. Provisional Patent Application Ser. No. 60/703,382 filed Jul. 27, 2005, entitled "Association, Authentication, and Security in a Network," which is hereby incorporated by reference herein for all purposes.

FIELD OF THE INVENTION

The present invention is related to communication networks and, in particular, to providing secure communications therein.

BACKGROUND

A network in general comprises one or more devices that communicate with each other. One issue that network administrators or managers face is security, i.e., ensuring that their networks are secured against unwanted hackers and unauthorized users. Although encryption or security keys are currently used in some networks, these networks are vulnerable to unauthorized interception of keys and transmission of dummy keys. For example, network managers seeking network security may contend with "man-in-the-middle" attacks. In general, this type of attack occurs when a hostile user substitutes its own one or more public keys for those of bona fide users, and then relays the messages between these users gaining information from the messages or substituting its own information depending upon the nature of the attack. For example, this security breach occurs when one device (e.g., Device A) sends a security or encryption key to another device (e.g., Device B), and a "middle man"—i.e., an unauthorized user, reads that key and sends a dummy key to Device B. Device B assumes that the dummy key was sent by Device A. Vice versa, Device B may also in turn send a key to Device A, which is also intercepted by the unauthorized user. In this situation, Devices A and B are using dummy keys provided by the unauthorized middleman to encrypt their messages. Considering that the middle man provided these keys, messages encrypted by these dummy keys and sent via the network are easily decrypted—for example, by those keys or their matching private keys, and thereafter read or adulterated by the middle man.

Another issue that network managers face is the ease of network management. One process performed by some network managers is device association/authentication. This process or collection of processes generally enables network managers to indicate to the network that a particular device should be connected and authorized, for example, to receive and send communications within the network. In some situations, this process requires a network manager to enter, one or more times, a network password or encryption key. This process becomes cumbersome, particularly when the network has a number of devices and the password or key to be entered is long and cryptic. This process also generally includes a network manager having access to a keyboard to enter such key or password.

Furthermore, in other networks, station invalidation requires physical access to the station itself. For example, if the manager desires to invalidate a station, the manager physically removes that station to be invalidated from the network and then assigns a new network password to be used by the remaining valid stations. Thus, even if the invalidated station is reconnected, it cannot be authenticated or read messages, because its unchanged network password is now invalid.

SUMMARY

In some embodiments of the invention, a method of establishing a secure channel between a first device and a second device in a network is provided. The method includes the steps of providing a first key associated with the first device; scheduling within one or more time slots the transmission of a second key associated with the second device; encrypting the second key using the first key; and sending the encrypted second key at the scheduled one or more time slots.

In other embodiments of the invention, a method of secure communication between a first device and a second device within a network is also provided. The method includes the steps of: requesting network association by the first device; establishing a secure channel between the first device and the second device by exchanging a first key and a second key, wherein the first key is associated with the first device and the second key is associated with the second device, wherein the second key is encrypted using the first key, and wherein the encrypted second key is sent at a scheduled one or more time slots; and authenticating the first device within the network, wherein the authenticating step includes providing a set of network credentials that includes a network encryption key and a network authentication key via the established secure channel.

In other embodiments of the invention, a device that is adapted to be operably coupled to a network is provided. This device includes a key module, and encryption/decryption module, and a communication module. The key module is adapted to determine one or more keys. The encryption/decryption module is adapted to encrypt and decrypt messages in the network. The communication module, on the other hand, is adapted to establish a secure channel with at least one station. The secure channel is established by exchanging a first key and a second key, wherein the first key, the second key, or both the first key and the second key are determined by the key module, wherein the second key is encrypted by the encryption/decryption module using the first key, and wherein the encrypted second key is exchanged within one or more scheduled time slots.

In other embodiments, a system is provided. The system includes a first device, a second device, and a network. The first device is adapted to send a first key associated with the first device; and request a second key associated with a second device. The second device is adapted to encrypt the second public key using the first public key; and send the second key within a scheduled one or more time slots allocated for the second device to send the second public key. The network is operably coupled to the first device and the second device.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
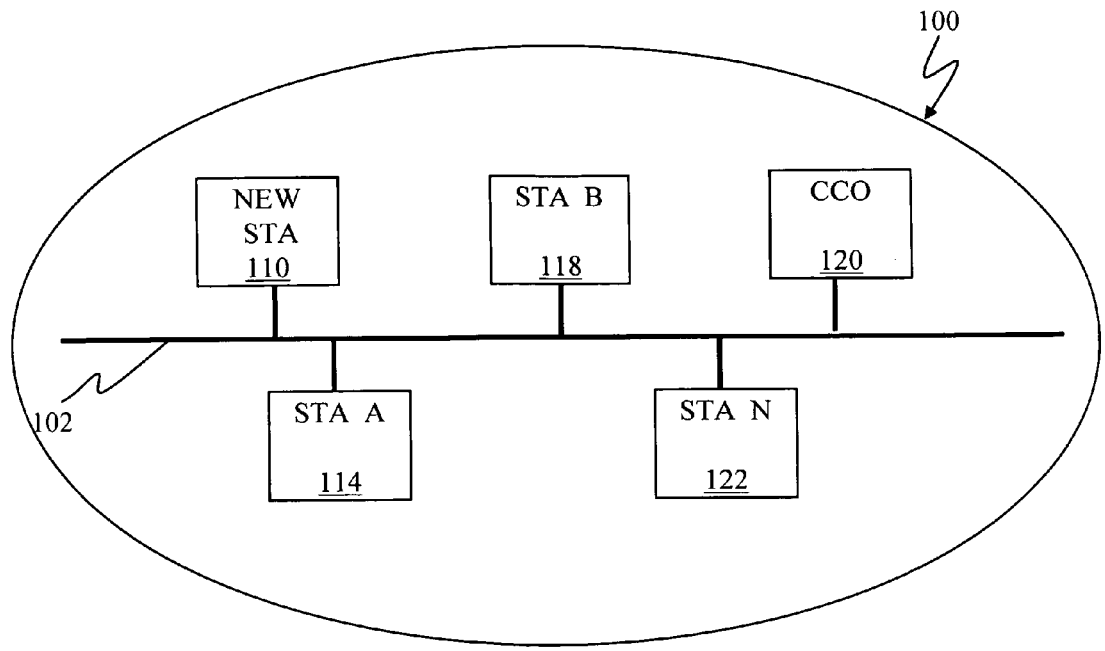
FIG. 1 is a high-level block diagram of an exemplary network according to an embodiment of the present invention.
Figure 2:
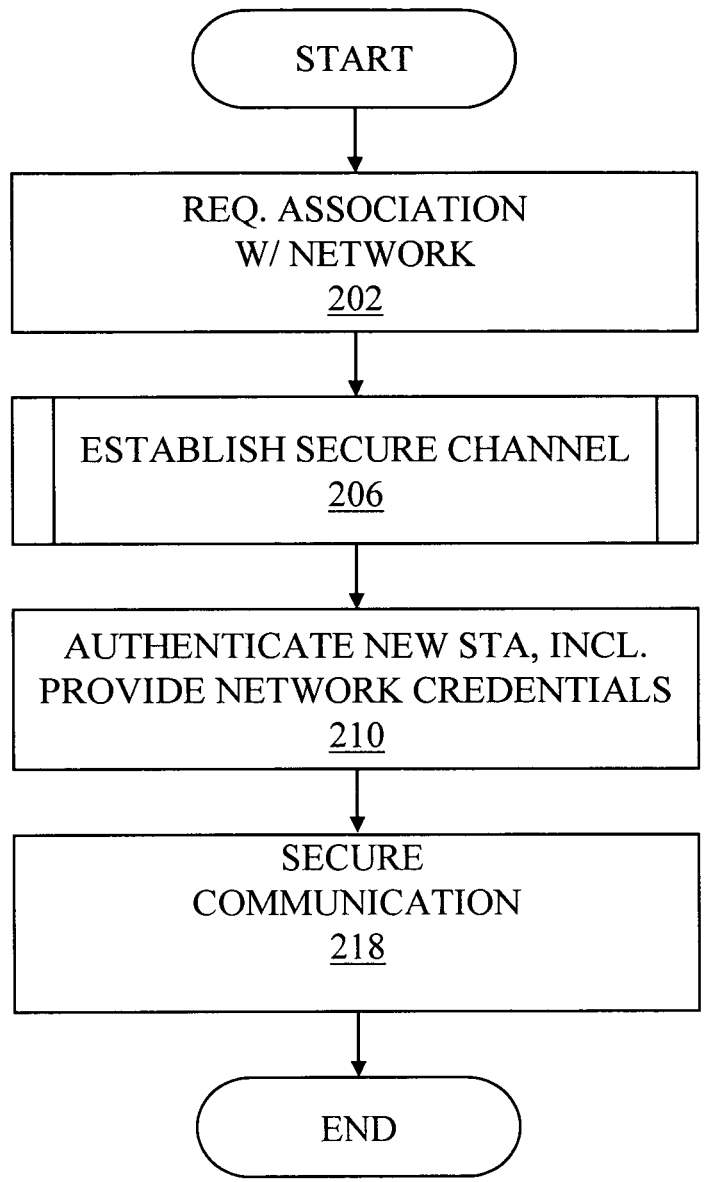
FIG. 2 is a high-level flowchart illustrating steps a station may take to associate and be authenticated within a secure network in accordance with an embodiment of the present invention.

To better understand the figures, reference numerals within the one hundred series, for example, 100 and 118, are initially introduced in FIG. 1, reference numerals in the two hundred series, for example, 200 and 222, are initially introduced in FIG. 2, and so on and so forth. So, reference numerals in the eight hundred series, e.g. 804 and 820, are initially introduced in FIG. 8.

FIG. 1 is a high-level block architecture of a network 100 according to an embodiment of the invention. In this exemplary embodiment, the data communication network is a power line network. Power line communication (PLC), sometimes also called broadband over power line (BPL), is a wire-based technology—which typically uses medium and low voltage power lines for data communications. These power line networks include networks created by using electrical wirings, for example, in homes and buildings. Data communicated for example, include, but are not limited to, music, streaming videos, files, databases, text files, control commands, and network keys.

In some embodiments of the invention, a network may communicate via Time Division Multiple Access (TDMA) and/or Time Division Multiplexing (TDM) schemes or other processes used for shared medium, such as radio and power lines. In general, TDM enables several users/stations to share the same frequency by dividing an assigned frequency or frequency band into different time slots. The stations transmit in rapid succession, one after the other, each using their own defined or reserved time slot. TDMA and TDM are techniques known to those of ordinary skill in the art and may be used with PLC technology. The networks of several embodiments of the present invention typically exploit channel bandwidth via TDMA or time-division multiplexing processes or schemes. In some embodiments, PLC audio-visual (AV) networks or systems are based on filtered multi-carrier (e.g., via orthogonal frequency division multiplexing or OFDM) modulation that enables the network to support both frequency and time division multiple access (e.g., multi-user OFDM Access).

An exemplary centralized network of the present invention typically includes two general types of entities—stations and a central coordinator (CCO). Each network typically comprises one CCO and zero or more stations. Any station typically, however, may function as the CCO provided it has sufficient capabilities. In some embodiments, a station typically becomes or is the CCO if it is the only device within that network. A CCO in general controls bandwidth and time allocation to all stations within the network, as well as the security features of several embodiments of the present invention. A CCO may also control and schedule its own network activities. Stations that may be connected to this PLC network 100 include devices such as TVs, VCRs, computers, game consoles, sound systems, information appliances, home audio equipment, or any other device that is PLC-enabled or is able to communicate via the power lines for the power line-based network examples. Although the embodiments of the invention herein are exemplified and discussed using power line networks, features of several embodiments of the present invention are also relevant to other networks, particularly those that use time-scheduling technology, such as TDMA, time-division technology, or to any processes and devices that can control the substantially precise timing of when certain information are to be sent and/or read within the network. The use of power line networks are examples explained to aid in understanding the features of the invention.

The network 100 of the present invention includes a CCO 120 and four stations: "New STA" 110; "STA A" 114; "STA B" 118, and "STA N" 122; connected via a power line 102 as the interposed network segment. In this embodiment, three stations, STA A 114, STA B 118, and STA N 122—have already been authorized and authenticated. A new station, NEW STA 110, however, is requesting authorized connection and use within the network.

The authorized and secure use of the data communication lines within the network typically entails a general two-phase process. In the first phase, a station requests association and authentication within the network. In the second phase, a station is granted secure data communication within the network. In this way, the system of the present invention may check for unauthorized and illegal station connections in the network, and may also ensure secure data communication within the network.

In one embodiment, not shown, there may be more than one network 100 such that these networks form a group of networks. This group of networks, depending on architecture, may communicate with each other. In another embodiment, not shown, there are a number of groups of networks that may also communicate with each other. In other embodiments, only certain stations within a network may communicate with each other or with other networks or stations outside of its own network. Furthermore, in another embodiment, portions of a group or the entire group itself may communicate with another group of networks or portions thereof.

FIG. 2 shows a high-level flowchart of exemplary steps in executing these phases. In the first exemplary operation, the NEW STA 110 requests association with the network 100 (step 202). This request, for example, may be initiated by having the network administrator plug the station into the network via a network interface card. Typically, the NEW STA 110 has the capability of detecting available networks, either automatically or the detection may be initiated manually, such as by pushing a button on the station or on a device directly or remotely connected to the station. The available networks are typically presented on a user interface, such as via a visual display or auditory interface. In an exemplary embodiment of the invention, if there is only one available network, the station automatically requests network association. In other embodiments, the association request is initiated manually. This association step, in some embodiments, is initiated by one user action, such as pushing a button directly or remotely connected to the station, saying a verbal command, or clicking a mouse. In the instance where there is one network, and network detection and association request for one available network are done automatically, the network manager of embodiments of the present invention may request network association by plugging the station into the device and booting it up or otherwise starting the devices. Typically network detection, however, is performed automatically by the station, but the request to associate with a particular available network may be initiated by a manual request, for example, by pushing a button, double-clicking the available network with a mouse, voice command, or swiping a card.

In the second operation, a secure channel between the NEW STA 100 and the CCO 120 is established (step 206). This operation may be initiated concurrently with a manager's request for network association. For example, clicking on the available network to associate, i.e., association request, automatically initiates the operations needed to establish a secure channel between the requesting station and the CCO. Once a secure channel is established, the CCO 120 may then authenticate the NEW STA 110, if so desired by the network manager (step 210). The authenticating step in one embodiment may be initiated via one user action, such as via a button push. The order of the first two operations (steps 202 and 206), however, may be interchanged prior to the authentication operation (step 210).

The authentication step (step 210), including providing network credentials to the authenticated station, is typically performed after the secure channel is obtained so that the information about the NEW STA and the network is exchanged typically over a secure channel. The authentication process operationally may involve having the network manager approve the association request. This may be done, for example, by having the CCO, connected to a user interface, present the stations requesting association with the network and, from the presented list of requesting stations, the network manager selects the stations to be authenticated. The user interface may be a simple liquid crystal display (LCD) and user input may be performed by one user action, such as a push of a button or a tap on the screen. The user interface may also be via a terminal and keyboard.

The set of network credentials needed to appropriately communicate within the network generally includes the current network authentication key (NAK) and the current network encryption key (NEK) (step 210). Possession of the appropriate NAK in one embodiment is a sufficient condition for network authentication. In some embodiments, for example, if a particular station applies the NAK to encrypt a message that is sent to the CCO, that station is automatically authenticated and allowed to associate and transmit information within the network, after the CCO successfully decrypts the message encrypted with the NAK. In some embodiments, the NAK is not actually sent over the network in this step. Possession of the NAK also enables a NEW STA to rejoin the network with minimal user intervention, i.e., to rejoin the network, after that station has been dropped or unplugged, assuming, however, that the network has not changed the NAK used in the network. Alternatively, the NAK may be entered into or provided to the station manually, albeit not as efficient. Once the previous operations (steps 202 to 210) are performed, the NEW STA 110 may then start secure communication, such as exchanging encrypted data with other stations within the network 100 by using the NEK provided as part of the network credential information (step 218). The network credentials are typically stored in memory for later use by the NEW STA if so needed, e.g., after accidental unplugging of the NEW STA from the network.

The operations of several embodiments of the present invention thus enable a network manager to associate, authenticate, and/or even obtain a secure channel. The network manager is typically not required to enter any passwords or keys, or other complex data sequence. Furthermore, the re-association or rejoining of a dropped station may be facilitated by having the station have network credentials stored in local memory.

Beacons:

In some embodiments, the CCO manages the activities of devices and stations within its network using, for example, beacons. Beacons are typically control messages that identify the frame configuration and the bandwidth (BW) assignments within a time frame to multiple networks and to devices within a given network, such that they are used by the CCO of a network to synchronize and control transmission activities within the network 100. Beacons are typically broadcasted by each CCO, e.g., as a multi-network broadcast, and are decoded by the stations within the network and, in some embodiments by the CCOs of neighbor networks, including those that may be outside of the group. Beacons are also typically tagged or identified, such that stations within a network decode and follow the BW allocation of its own network beacon and not the beacon of another network. Beacons are also transmitted or broadcasted, typically periodically, into the networks. In some embodiments, beacons may be unencrypted. In other embodiments, beacons may be completely or partially encrypted or portions thereof. In general, a beacon may contain other information, such as, but not limited to, MAC address of the CCO, check sum values, management and control information. Beacons may also include station information and thereby providing the station one or more timing references as to when to transmit and/or listen to messages being sent within the network.

Figure 3:
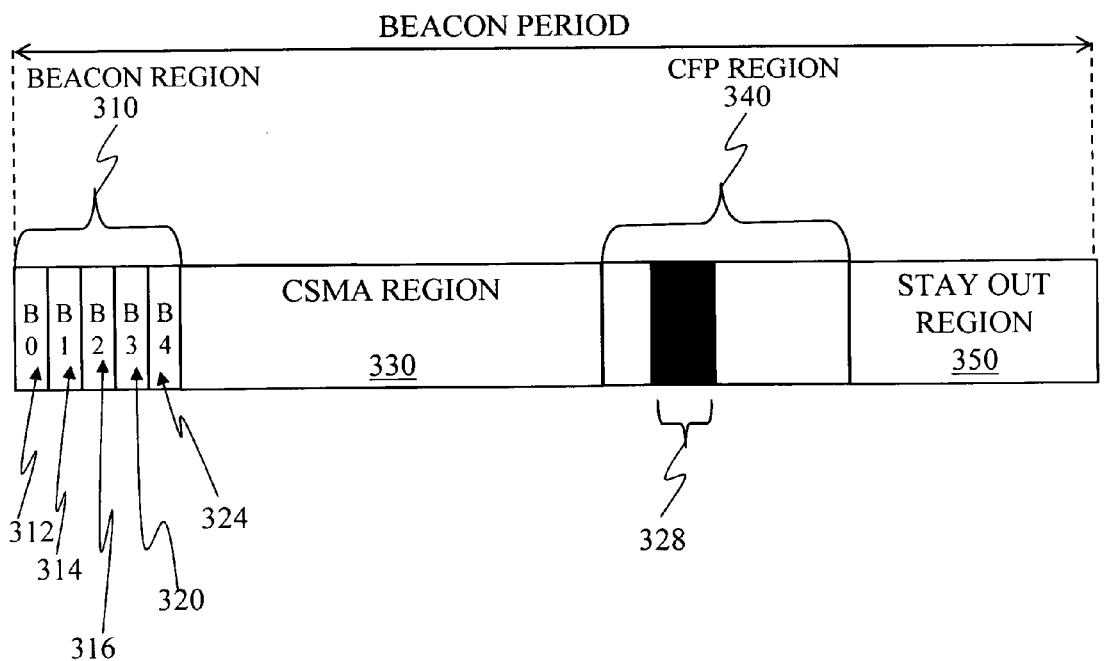
FIG. 3 is a high-level block diagram of a beacon period according to an embodiment of the invention.

FIG. 3 is an exemplary diagram of a beacon period for a network. In some embodiments of the invention, a beacon comprises several parts or regions. Each region is further typically defined into one or more time slots (e.g., 312, 314, 316, 320, 324, and 328). In an exemplary embodiment, a beacon comprises four regions.

Beacon Region:

In some embodiments, a beacon region 310 is the region wherein a CCO is able to transmit its own beacon. The beacon region generally includes a plurality of a certain number of beacon or time slots, with the duration of each beacon slot typically sufficient for the transmission of a beacon. In some embodiments, the duration of each beacon slot is equal to the sum of the duration of a beacon PHY protocol data unit (PPDU) and the interframe space. A beacon region 310, in some embodiments, includes from one up to a maximum number of time slots or beacon slots—typically defined within the system. In some embodiments, the size of the beacon region 310, including the number of time slots, may be adjusted dynamically by the CCO. Where there are a number of networks 100 and each network has one CCO, in some embodiments, each CCO typically transmits a beacon in one of the beacon slots within the beacon region every beacon period. In some embodiments, information or data about the beacon region and/or time slots within the beacon region—for example, the number of beacon slots within the beacon region, the beacon slot ID that the CCO is using to transmit its current beacon protocol data unit, and/or the start and/or end time—are kept by the CCO and/or by the CCO of the other neighbor networks. In some embodiments, if there is only one network 100, typically only one beacon slot is used to transmit network scheduling and BW allocation.

In some embodiments, the number of beacon slots in a beacon region may depend on the number of centralized networks in the system. FIG. 3 shows a number of beacon slots 312, 314, 316 320, 324 in the beacon region. Relating FIG. 1 to FIG. 3, if there is only one centralized network or network, there is typically only one beacon slot 312 defined within the beacon region, which is used by that one centralized network 100, particularly, by the CCO 120 of that network. Thus, a beacon region may support only one single beacon slot, and the size of the beacon region is adjusted accordingly. Thus, FIG. 3 has to be modified, for example, to have only one beacon slot, e.g., slot B0 312, to support the network 100. The other beacon slots 314, 316, 320, 324 are typically not present. Furthermore, the size of the beacon region is typically adjusted accordingly depending on the number of beacon slots.

Carrier Sense Multiple Access (CSMA) region or Contention Period (CP) Region: The CSMA region 330 is a region wherein any one or more of many contention access protocols are used to share the medium and to coordinate network traffic. In some embodiments, a CSMA/CA protocol may be used. A network may have one or more CP or CSMA regions. The CSMA region 330 generally allows stations to contend for the channel, typically based on a connection specification, for example, based on priority.

Reserved Region or Contention-Free-Period (CFP) Region:

This reserved or CFP region 340 is a period within a time frame typically when only stations or devices that have explicit authorization from the CCO are allowed to transmit. A reserved region is a time interval that is typically reserved by a network. The network that owns the reserved region typically schedules the transmission of its contention-free links here. In addition, the CCO may also schedule CSMA allocations that may be used only by the STAs in that network. For example, time slot 328 in the reserved region 340 has been allocated by the CCO to STA A 114, so that STA A 114 may freely transmit at that time slot or interval 328 without interference, conflict, or contention from other stations within the network or other networks. Stated another way, in the time slot allocated to STA A only, i.e., time slot 328, STA A may freely transmit, while other stations in that network 110, 118, 122, 120 or other neighbor networks in the group are typically silent. This allocation is typically transmitted by the CCO via beacons, such that when a station decodes its own network beacon, information about which station is to use that time slot is also defined within the beacon. In another embodiment, a message directly to the station may also be sent by the CCO to the scheduled station so that the station is able to determine when to transmit and sometimes even listen.

Stayout Region:

The stayout region 350 is a period within the time frame when all stations assigned a stayout region are instructed by the CCO to remain silent, meaning no transmission. Typically, these devices or stations are also not to use any contention access or contention-free access protocol. A stayout region is typically assigned to avoid conflicts with a device or another network, not shown, that has been assigned a reserved region or CFP in the same time interval. Thus, in time slot 328, all other stations 110, 118, 122, 120, except STA A 114, are instructed by the CCO 120 to be silent, i.e., to not transmit.

In one alternative embodiment, the various types of regions, e.g., a stayout region, need not be allocated in one contiguous time interval. This means, for example, that the various types of regions may interleave each other, e.g., a time frame or beacon period includes a beacon region, followed by a CSMA region, followed by a stayout region, followed by another CSMA region, and then followed by a reserved region. The various regions within a beacon period may also be of varying sizes with varying number of time slot intervals or durations. In one embodiment, the end time of each region type within a beacon period is stored, for example, in multiples of a defined allocation time unit (AllocationTimeUnit), e.g., 0.32 msec. Variations on the manner of how a CCO informs the various stations within its network on how to allocate and schedule transmissions are expected. For example, instead of via beacons, a direct message containing scheduling information may be sent directly by the CCO to each station within the network.

Based on the beacons transmitted by the CCO, the stations or devices within a network are able to share bandwidth using the same medium or channel, e.g. power line medium. The CCO in each network thus typically controls BW allocation and scheduling within its network. The stations within the network thus decode their own network beacons, and accordingly perform their functions, such as network transmission, following the beacon period allocations or schedule. The stations within the network 100 typically transmit and receive messages within the network based on the beacon schedule allocated by the CCO.

Figure 4A:
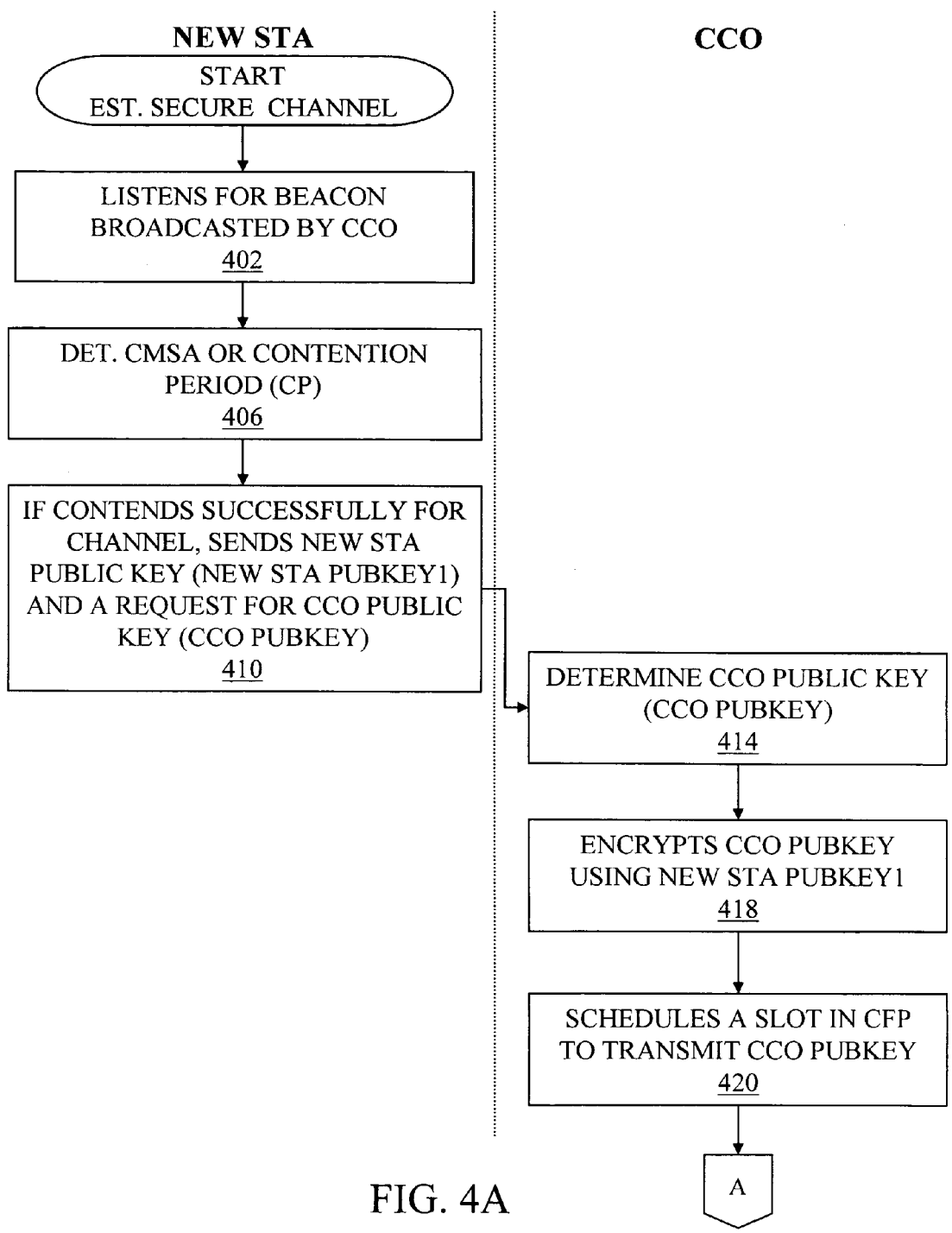
FIGS. 4A and 4B show a flowchart of how a secure channel may be established between a station and a central coordinator, according to an embodiment of the invention.
Figure 4B:
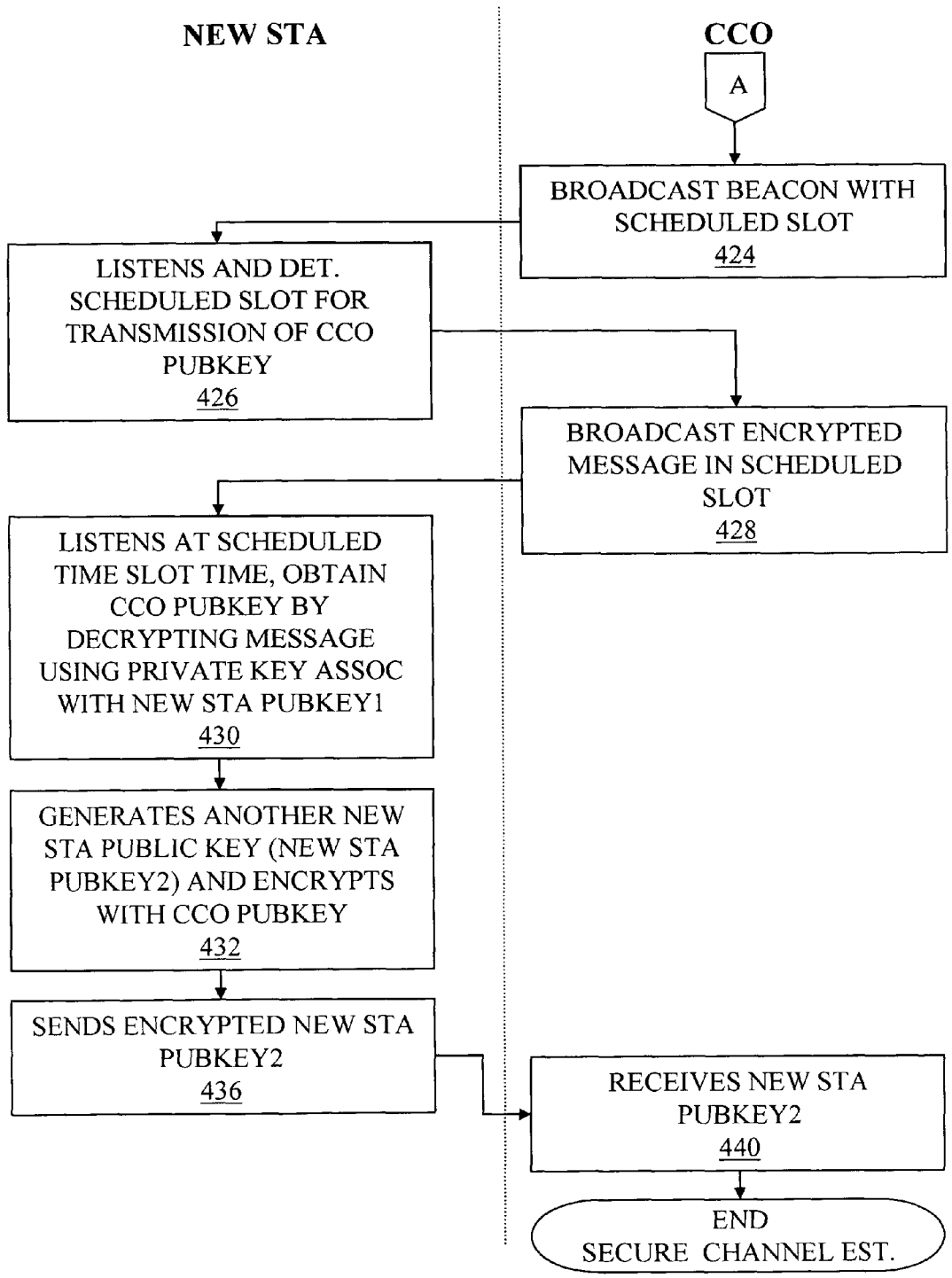

FIGS. 4A and 4B show an exemplary flowchart of steps to obtain a secure channel between a station and a second device, particularly a CCO in this example. The NEW STA 110 requesting to be connected to the network, typically via a time division multiplexing process or a TDMA protocol, listens for the beacons transmitted or broadcasted by the CCO (step 402). The NEW STA requesting secured connection determines the CSMA or the contention-period time interval from the broadcasted beacons (step 406). The NEW STA 110 waits for this CSMA time interval and contends for the channel until it is successful (step 410) in obtaining the time interval. Once the NEW STA 110 obtains the time interval, it may transmit a plaintext or unencrypted public key (NEW STA PUBKEY1) to the CCO as well as a request for a public key from the CCO (CCO PUBKEY) (step 410). The NEW STA 110 typically retains the private key that may be associated with NEW STA PUBKEY1. This CCO public key request is typically unencrypted and may be heard i.e., received by other stations within the network. In one embodiment, information about the identity of the requesting NEW STA is not sent. Thus, although stations may hear the request for a public key, the identity of the requesting station is typically not transmitted in the network.

For purposes of illustration, there are two basic types of cryptography/encryption: secret key or symmetric cryptography and public key or asymmetric cryptography. These keys are generally represented as numbers. In secret key cryptography, one key is shared by two or more parties or stations. To encrypt a message, a mathematical function or algorithm is typically applied that takes the message and the key as inputs and in executing the steps of the algorithm thereby generates an encrypted message. The reverse operation, decryption, also requires the use of the same key. Thus, stations that have the same secret key may encrypt and decrypt, i.e., read, the same messages, while those that do not have the key cannot so straightforwardly communicate.

Public or asymmetric key cryptography, on the other hand, uses a pair of keys—a public key and a private key. Encryption of a message is done using the public key, while decryption is done using the private key. Thus, anyone with the public key can encrypt a message, but only the person who has the private key can decrypt and read the message. The private and public keys are mathematically related, but the mathematical techniques are such that knowledge of one of the keys does not typically enable a person to calculate or derive the other key. Determining the matching key using the other key of the pair is extremely difficult often to the point of being highly improbable. Various cryptographic and encryption techniques which may be applied are known to those of ordinary skill in the art.

The set of public keys used in obtaining the secure channel may be dynamically generated in real-time and/or be previously generated. In some embodiments, when the NEW STA 110 is booted up or otherwise initiated, part of the boot-up or initialization process is the generation of one or more sets of keys, whether symmetric or asymmetric. These keys are then stored in memory, such that when the user requests association and authentication or when such requests are automatically initiated, the keys are typically retrieved from memory rather than being generated in real time. In another embodiment, the set of encryption keys are burned into hardware, i.e., stored in nonvolatile, read-only memory such as a programmable read-only memory (PROM) or erasable PROM (EPROM) during manufacture.

The CCO typically determines a CCO public key (CCO PUBKEY) in response to the request (step 414). The CCO PUBKEY may be dynamically generated or be previously generated. The CCO typically retains the private key associated or related with the CCO PUBKEY. The CCO also typically encrypts the CCO PUBKEY using the public key, NEW STA PUBKEY1, previously sent by the NEW STA (step 418). The CCO also schedules a set of time slots—one or more time slots—typically in the CFP region, e.g., time slot 314 in FIG. 3, wherein the CCO transmits the encrypted CCO PUBKEY (step 420). The CCO then broadcasts the beacon or set of beacons indicating the scheduled time slot wherein the encrypted CCO PUBKEY is to be sent (step 424). Considering that the CCO PUBKEY is encrypted using the public key NEW STA PUBKEY1, only the NEW STA is typically able to decrypt and read the message, using the associated private key of the NEW STA PUBKEY1, and other stations generally cannot.

It is possible that a hostile user or an unauthorized user has been listening to these messages being sent within the network. At this point, the hostile user knows the NEW STA PUBKEY1, considering particularly that it was sent as a plaintext or unencrypted. It also knows that a request for a CCO public key has been sent. The hostile user may also have listened to the beacon indicating when the CCO will send the requested CCO PUBKEY. At this point, the hostile user may generate its own dummy key, encrypt the dummy key with the NEW STA PUBKEY1, and send the dummy key at the scheduled time interval allocated by the CCO. In this exemplary operation, the hostile user is trying to send its own key so that it can masquerade as the CCO, and enable it to read and send messages to and from the NEW STA and the CCO. At the scheduled time slot, both the CCO and the middleman/hostile user send their respective keys. Because a collision occurs when both the CCO and the hostile user send their keys, the transmission of either keys would fail. So in this exemplary scenario, the man-in-the middle attacks are thwarted—no keys exchanged but rather a jammed time slot or collision occurs. In some embodiments, the CCO may also have a module gathering statistics that may include when such CCO public key transmission failures occur. These statistics may be used to generate and send messages to network managers alerting them that a possible hostile user is present within the network.

The NEW STA listens i.e., monitors its received signals, for the appropriate beacon or set of beacons and determines the scheduled time slot wherein the CCO PUBKEY is scheduled to be transmitted (step 426). At the scheduled time slot, the CCO broadcasts the CCO PUBKEY encrypted using the NEW STA PUBKEY1 (step 428); concurrently the NEW STA listens to obtain the encrypted CCO PUBKEY. Assuming that there is no man-in-the middle attack, the encrypted CCO PUBKEY is decrypted and then read using the NEW STA private key—matching pair of NEW STA PUBKEY1 (step 430). At this point, the NEW STA and the CCO may use the NEW STA PUBKEY1 and the CCO PUBKEY including respective matching keys, to securely and privately communicate with each other. In one embodiment, the NEW STA only accepts the message or messages containing the CCO PUBKEY in encrypted form, meaning encrypted with NEW STA PUBKEY1.

After determining the CCO PUBKEY, the NEW STA optionally determines a new public/private key pair, which is used for secure communication between the CCO and the NEW STA. This new public/private key pair may be generated dynamically or previously generated and retrieved, for example, from memory, i.e., the key pair was previously generated and stored. The public key, i.e., a third public key that may be sent via the network, of this new key pair (NEW STA PUBKEY2) is then typically encrypted using the CCO PUBKEY (step 432), and then sent, either during a scheduled time slot or within the contention period, to the CCO (step 436). The CCO then listens for the NEW STA PUBKEY2 (step 440). In one embodiment, this NEW STA PUBKEY2—e.g., the public key of NEW STA—is stored in CCO memory and used for later occurrences when a secure channel is typically required between the NEW STA and the CCO, e.g., during transmission of new network keys or network credentials. At the end of these operations, the CCO has the NEW STA public key (NEW STA PUBKEY2) so that it may send encrypted messages to the NEW STA. These messages may only be decrypted and read by the NEW STA. Moreover, the NEW STA may send encrypted messages to the CCO using CCO PUBKEY. Typically these messages may only be decrypted by the CCO. In one embodiment, the public keys exchanged may be used to encrypt the entire message or portions thereof.

Using the secure communication channel established via the private/public keys of the CCO and the NEW STA, the CCO may securely send the network credentials (step 210 in FIG. 2) to the NEW STA.

Figure 5:
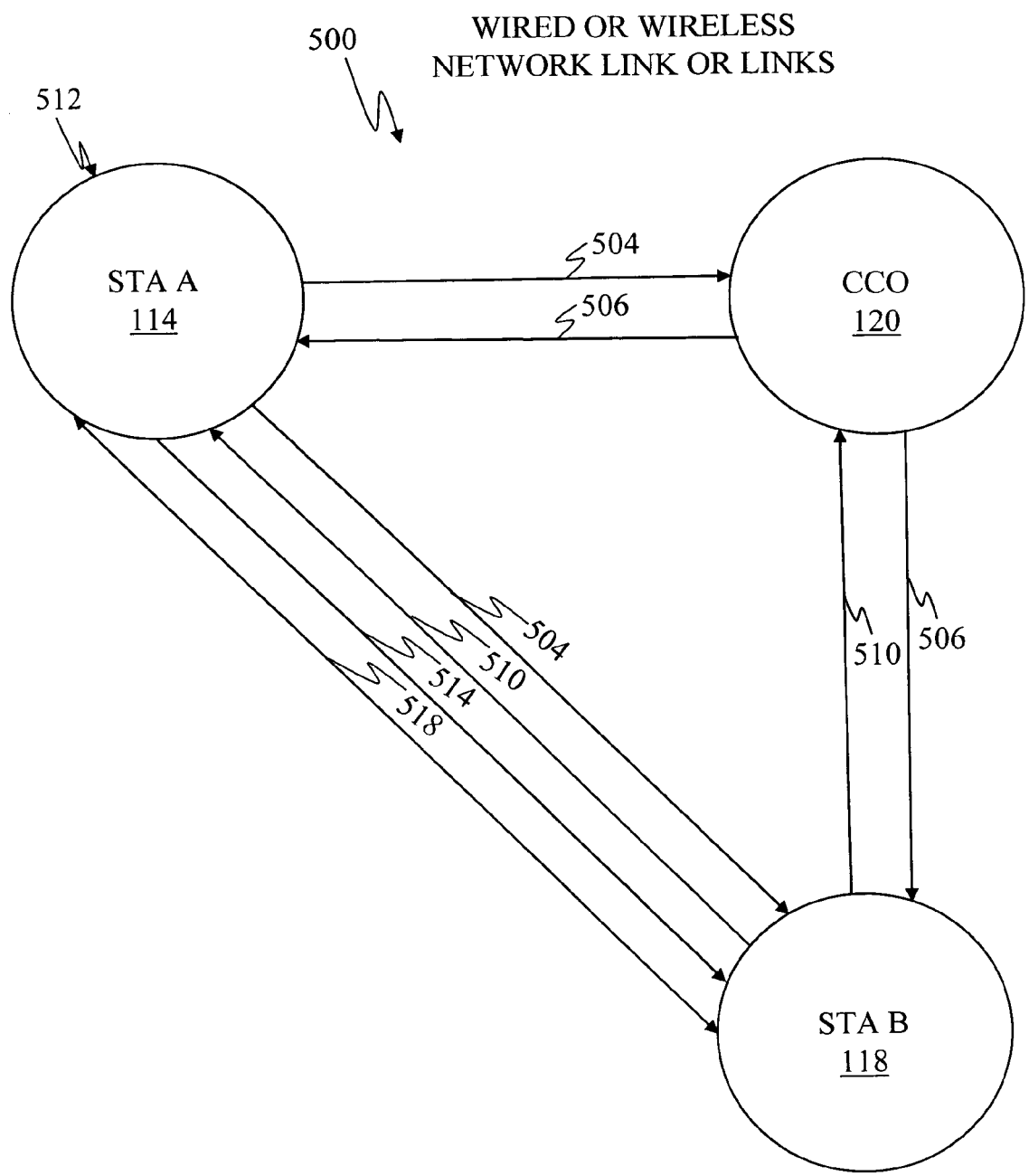
FIG. 5 is a signal flow diagram of how a secure channel may be established between two stations, wherein the two stations are not central coordinators, according to an embodiment of the invention.

FIG. 5 is a high-level signal flow diagram 500 illustrating exemplary signal flows in some embodiments of the present invention that may secure a channel between two stations, wherein neither of the two stations are concurrently functioning as CCOs. In the first operation, a first station, STA A 114, broadcasts a request for a public key 504 from STA B (STA B PUBKEY). Part of the request may optionally include information identifying the station requesting the public key. This request also generally includes a public key from STA A, STA A PUBKEY1, which may be dynamically or have been previously generated. This broadcast is typically heard, i.e., received and understood by both the CCO 120 and STA B.

Based on this request, in the next operation the CCO 120 broadcasts a schedule, e.g., a CFP time slot 506 within which STA B 118 is scheduled to send its STA B PUBKEY. This broadcast 506 is typically heard by both STA A 114 and STA B 118. In an alternative embodiment not shown, STA A, in addition to sending the request for STA B's public key, also sends a request to the CCO requesting time allocation of when STA B is to send its public key. In other alternative embodiments, STA B may request the time allocation from the CCO.

STA B hears the schedule 506, typically via beacon or beacons, and transmits its public key, STA B PUBKEY, 510 at the scheduled CFP time slot or slots. The STA B PUBKEY is sent typically encrypted using STA A PUBKEY1 and may be broadcasted. In one embodiment, information identifying or informing receiving stations that the original requesting station is STA A is not known to STA B or to those stations, including CCOs, which receive the request. In an alternative embodiment, STA A's identity is identified as part of the request. It is during this scheduled time slot or slots that a hostile user generally sends its dummy key 512 to replace STA B PUBKEY. If the hostile user sends the dummy key 512 within the same time slot, a collision occurs due to both STA B and the hostile user attempting to occupy the same channel at the same time.

Assuming that no collision occurs, STA A receives STA B PUBKEY, typically encrypted using STA A PUBKEY1. Thus, even if STA B PUBKEY is broadcasted, only STA A, with the appropriate private key associated with STA A PUBKEY1, is able to decrypt STA B PUBKEY 510. Optionally, STA A determines a new public/private key pair and sends the new public key 514 (STA A PUBKEY2), i.e., a third public key of the exemplary process, encrypted using STA B PUBKEY. Even if STA A PUBKEY2 is sent via broadcast, it is encrypted using STA B PUBKEY, thereby enabling only STA B to decrypt and read the message. A secure and private channel 518 between STA B 118 and STA A 114 is thereby established.

Invalidating a Station:

Station invalidation may be implemented in the various embodiments of the present invention. In some embodiments of the invention, a network has at least one NAK and at least one NEK. As discussed above, the NAK is used to authenticate the station into the network, while the NEK is used to encrypt and decrypt messages into the network. The NAK, NEK, or both may be implemented as symmetric or asymmetric keys. The NAK and NEK used in the network of the present invention may be dynamically generated or be previously generated and stored in memory, typically non-volatile memory rather than volatile memory. The NAK and NEK are typically sent via secure channels.

Figure 6:
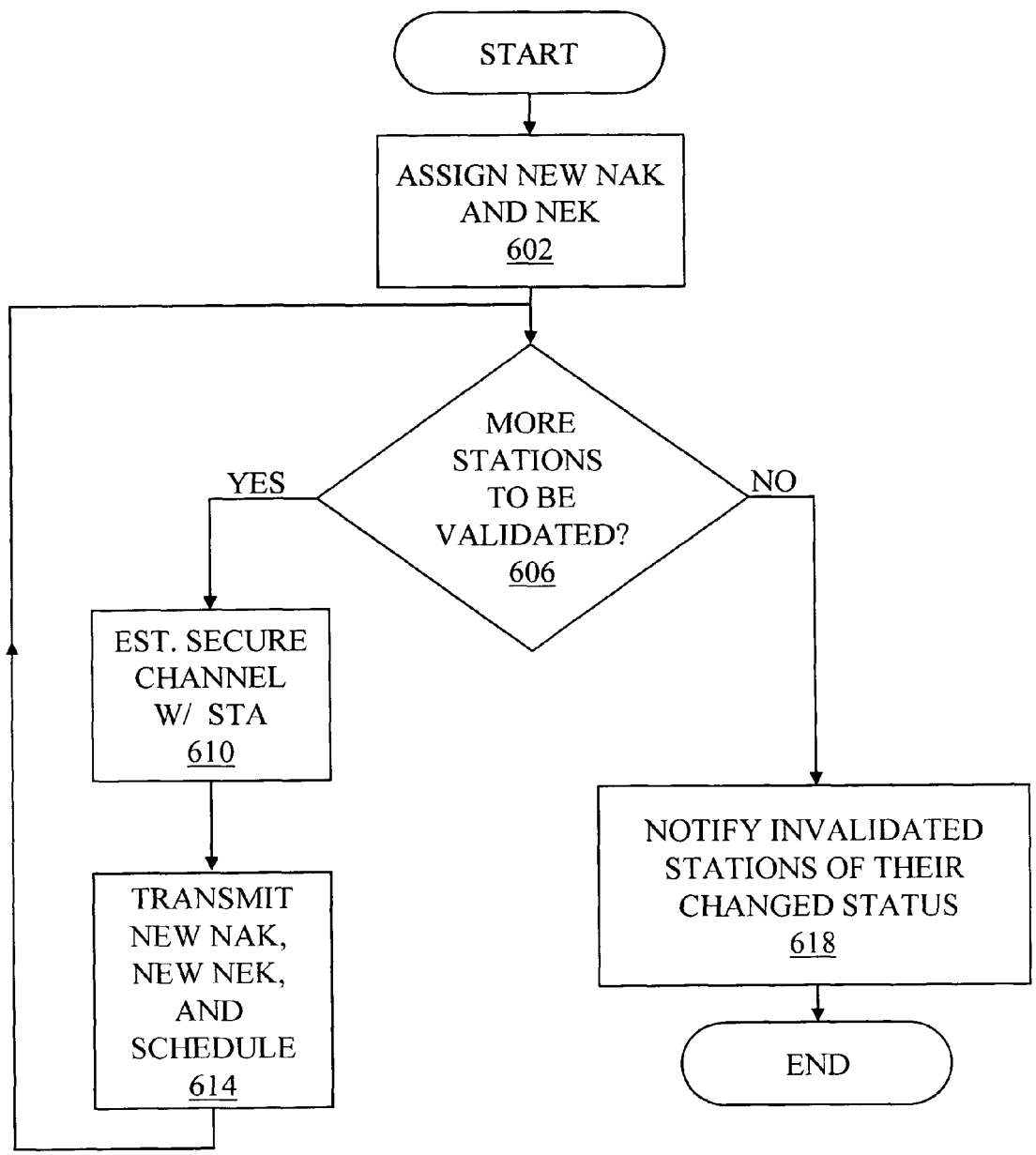
FIG. 6 is a flowchart showing how stations may be invalidated according to an embodiment of the invention.

FIG. 6 shows an exemplary flowchart of the operations that may be executed to invalidate one or more stations in the network. Using some of the functions of embodiments of the present invention, physical access to the station being invalidated is unnecessary. A station may be logically removed or invalidated from the network by changing the NAK and the NEK. Changing the NAK results in stations not having the current NAK to be automatically invalidated out of the system, while changing the NEK results in stations not being able to decrypt and read messages sent within the network.

In the first exemplary operation of FIG. 6, new NAK and NEK values are assigned, typically by the CCO (step 602). The NAK and NEK may be dynamically generated or previously generated and retrieved from memory. The CCO then typically determines if there are stations to be validated (step 606). Next, the CCO establishes a secure and private channel with each station in the network that is to remain authenticated in the network (step 610). This may be established by retrieving the public key previously sent by the station during the establishment of the secure channel between the CCO and the station, e.g., step 436 in FIG. 4B. Alternatively, a secure channel and a new public key or keys between the station and the CCO may be established as exemplified in FIGS. 4A and 4B. Using the secure channel, the CCO transmits new network credentials and a schedule when the new keys, NAK and particularly the NEK, are going to take effect (step 614). These operations (steps 610 and 614) are generally repeated for each station (step 606) that seeks to remain authenticated and validated within the system. In an alternative embodiment, the new NEK becomes effective for each station as it is notified. The stations to be invalidated are also notified by the CCO that they are going to be invalidated and removed from the network (step 618). These notifications may be performed via insecure channels, such as via broadcast messages.

Security in the network 100 is provided typically by encrypting network traffic with the current NEK. Some network traffic, however, may be intentionally left unencrypted such as beacons and control messages. In some embodiments of the invention, a network manager at his or her discretion may change network credentials at any time. This may be performed in several ways. For example, the CCO may assign a new NEK and then broadcasts a message encrypted with the old NEK containing the new NEK to all devices currently active on the network. In an alternative embodiment, the CCO may request a secure channel (e.g., See FIGS. 4A and 4B) between each station, and using that secure channel send the new NEK encrypted with that station's public key.

Figure 7:
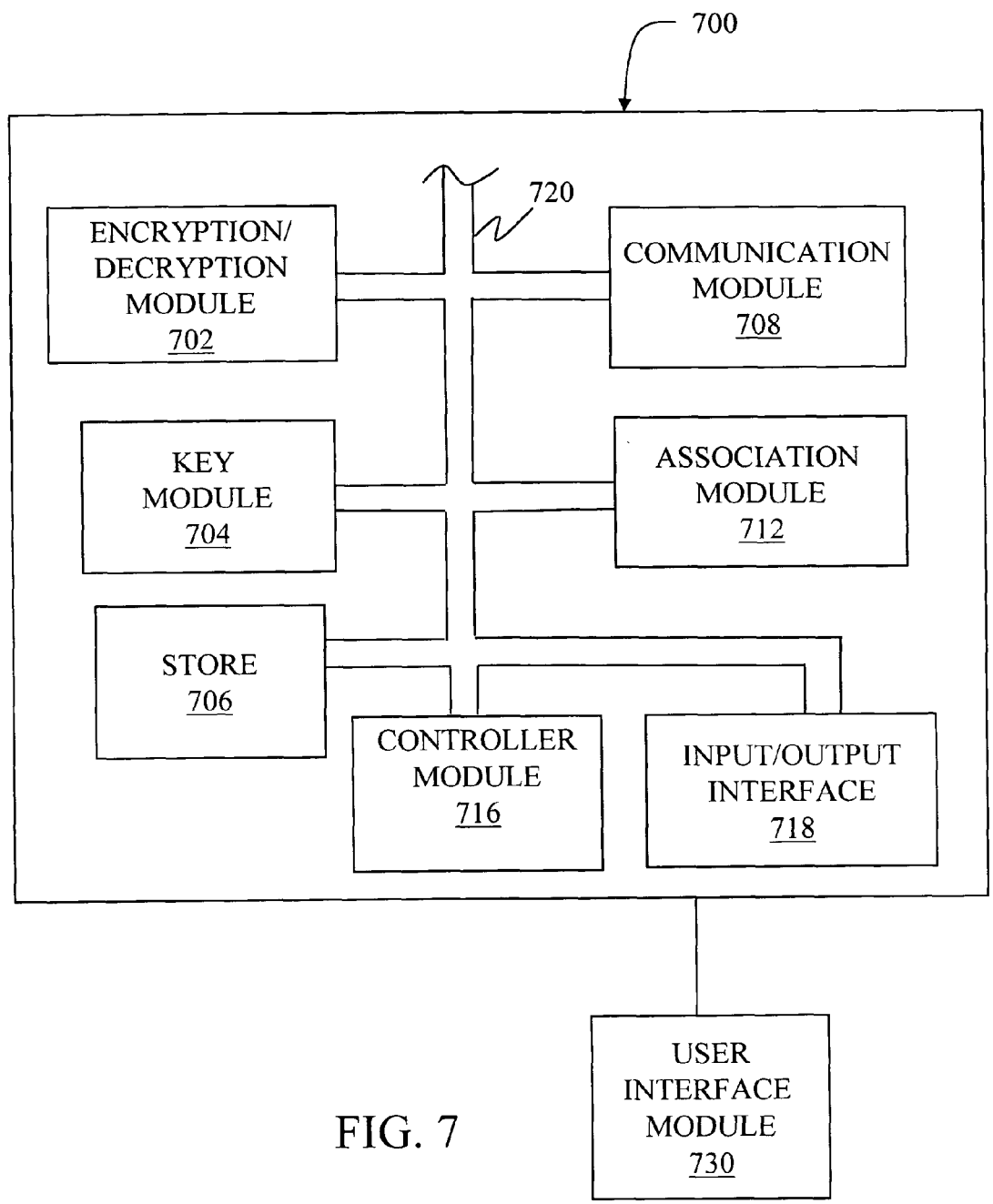
FIG. 7 is a block diagram of an exemplary station according to an embodiment of the invention.

FIG. 7 is an exemplary embodiment of a station 700 used within the network of the present invention. Typically, the station has an encryption/decryption module 702, a key module 704, a communication module 708, an association module 712, and a controller module 716. These modules typically interface and are operably coupled 720 with each other. The various communication paths 720 between the modules and within the device may be a bus, dedicated lines, a synchronous or asynchronous or combinations thereof. In some embodiments, the functions of the two or more modules may be combined into one or more modules and the functions of one or more of the modules may be distributed across two or more modules.

The encryption/decryption module 702 typically processes the steps of encrypting and decrypting of messages within the network. In some embodiments, this module also performs the step of encrypting of messages or portions thereof, such as encrypting a portion of a message that contains a key. For example, in response to a request, the key module 704 is typically adapted to determine or generate cryptographic keys. These keys may be dynamically generated or be retrieved, for example, from memory—typically from non-volatile memory. These stored keys may have been previously generated by the key module or by other modules, or may have been manufacturer-supplied. In some embodiments, the key module generates or determines symmetric, asymmetric, or both types of keys. The key module 704, for example, in response to requests for public keys (e.g., FIG. 5) may interface with the communication module 708 so as to transmit the requested keys via one or more secured channels. The station 700 may also include other modules, such as a store 706 comprising volatile or non-volatile memory elements wherein one or more encryption keys may be held.

The communication module 708, in some embodiments, performs and manages the communication functions of the station 700, particularly establishing secure channels with devices in and/or outside the network, including with the CCO. The communication module 708 may also handle the transmission and reception of messages, e.g., beacons, requests, and messages particularly addressed to the station 700. The association module 712 typically performs the association functions of the station, such as network detection, providing the user the ability to select one or more networks, and requesting association with a CCO. The controller module 716 interfaces with and typically controls the various modules of the station, and is typically responsive to the one or more control beacons received. In some embodiments, messages received via the communication module are routed to the controller module 716 for processing to comply with beacon schedules so that, for example, station 700 sends a requested key within the scheduled time slot, typically within a secured private channel. Each station may include a user interface 730, which may be part of the device 700 or directly connected via an input/output interface 718 or remotely connected with the station 700 via one or more interposed network links. The user interface 730 module may be a simple button attached to the station or any simple or complex user interface means directly or remotely attached to the station 700.

Figure 8:
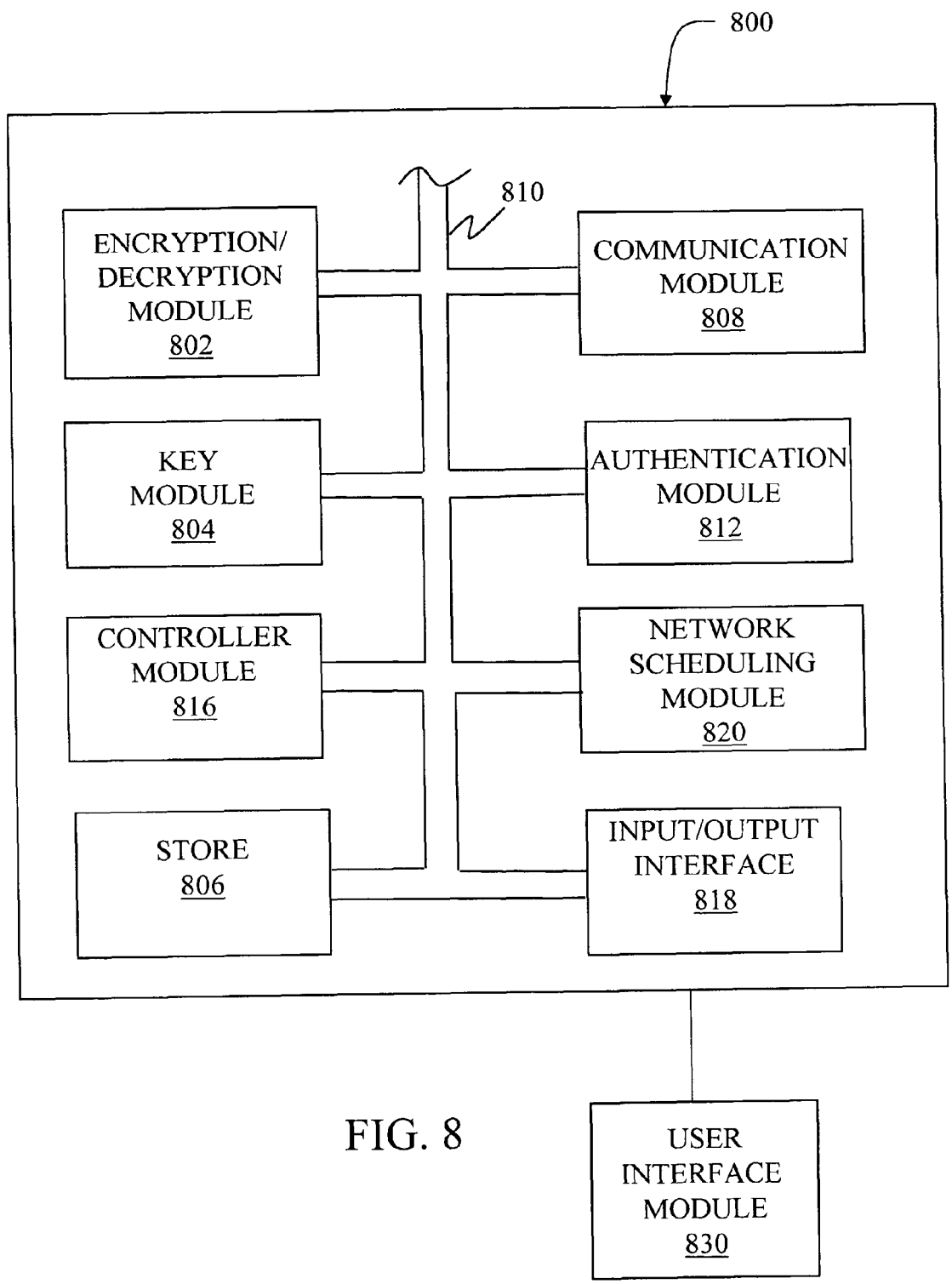
FIG. 8 is a block diagram of an exemplary central coordinator according to an embodiment of the invention.

FIG. 8 is an exemplary embodiment of a CCO 800 used within an exemplary network of the present invention. Typically, the CCO has an encryption/decryption module 802, a key module 804, and a communication module 808—similar to the modules included in the exemplary station 700. The controller module 816 is similar to the controller module 716 of the station 700, i.e., it coordinates and controls the one or more modules of the CCO 800. The controller module 816 moreover may direct one or more modules to perform some processes depending on the network schedules determined by the CCO or received by the CCO from other CCOs.

The CCO may also include an authentication module 812 that performs the authentication functions of the CCO, such as authenticating stations, including transmitting network credentials to these authenticated stations. The network scheduling module 820 performs network scheduling functions, including allocating time slots to devices within the network, sending out beacons to the network, broadcasting control commands, and coordinating with other CCOs or groups. A CCO typically includes a user interface 830, which may be part of the device 800 or directly connected via an input/output interface 818 or remotely connected with the CCO 800 via one or more interposed network links. The user interface 830 module may be a simple button attached or any simple or complex user interface means directly or remotely attached to the CCO 800. The CCO 800 may also contain other modules, such as a store 806 comprising volatile or non-volatile memory elements wherein one or more encryption keys may be held. Set of program instructions may optionally also be stored herein, similar to a station 700. The various communication paths 810 between the modules and within the device may be a bus, dedicated lines, a synchronous or asynchronous or combinations thereof. In some embodiments, the functions of the two or more modules may be combined into one or more modules and the functions of one or more of the modules may be distributed across two or more modules. The modules described in FIGS. 7 and 8 may be implemented in hardware, via one or more sets of program instructions, e.g., software, executed on one or more special or general processes, or both hardware and software, e.g., firmware. The set of program instructions may also be received via data streams.

The embodiments of the present invention thus provide methods, systems, and devices, wherein security may be established without providing passwords. In some embodiments, security may be established by providing only one user action. Furthermore, the embodiments of the present invention provide methods, systems, and devices facilitating the expulsion or disassociation of unauthorized stations from the network, as well as deterrence of MITM attacks, by virtue of allocating or being made aware when a message, e.g., key exchange, is expected.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. For example, the sequence of order of when one or more operations may be performed may be modified or be concurrently executed as opposed to what is shown in the figures; secret keys may be used rather than a private/public key pair or vice versa; and user input may be via nontraditional interfaces, such as via fingerprint or biometrics authentication/password. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of establishing a secure channel between a first device and a second device in a network, the method comprising the steps of:
  providing a first key associated with the first device, wherein the first key is an unencrypted public key;
  scheduling within two or more time slots the transmission of a second key associated with the second device, wherein the two or more time slots are time intervals that are reserved by the network;
  encrypting, by the second device, the second key using the first key;
  broadcasting, by the second device, at least one beacon indicating the scheduled two or more time slots;
  sending, by the second device, the encrypted second key at the scheduled two or more time slots;
  determining, by the first device, a presence of a state of contention by detecting a plurality of received transmissions at the scheduled two or more time slots, wherein one or more received transmissions of the plurality of received transmissions is received from a device other than the second device;
  determining a third public key encrypted by the first device using the received second key, wherein the third public key is based on the determined presence of a state of contention for the encrypted second key; and
  exchanging the third public key, during a contention free state and scheduled two or more time slots that follow the determined presence of a state of contention at the scheduled two or more time slots.

2. The method of claim 1 further comprising decrypting the encrypted second key using a private key associated with the first key.

3. The method of claim 2 further comprising the step of encrypting the third public key, by the first device, using the decrypted second key.

4. The method of claim 3 further comprising the step of transmitting messages within the network, wherein at least one of the messages is encrypted using the third public key.

5. A method of secure communication between a first device and a second device within a network, the method comprising the steps of:
  requesting network association by the first device;
  establishing a secure channel between the first device and the second device by:
    exchanging a first public key and a second public key, wherein the first public key is associated with the first device and the second public key is associated with the second device, wherein the first public key is an unencrypted public key, wherein the second key is encrypted using the first public key, wherein the encrypted second public key is sent, by the second device, at a scheduled two or more time slots, wherein the two or more time slots are time intervals that are reserved by the network, and by exchanging a third public key encrypted by the first device using the received second public key, wherein the exchanging of the third public key is based on determining a presence of a state of contention by detecting a plurality of received transmissions for the encrypted second public key exchanged during a contention free scheduled two or more time slots that follow the determined presence of a state of contention, thereby providing both first device and second device with a third public key for subsequent encrypted communications for secure channel communication, wherein one or more received transmissions of the plurality of received transmissions is received from a device other than the second device; and authenticating the first device within the network, wherein the authenticating step comprises providing a set of network credentials comprising a network encryption key and a network authentication key via the established secure channel.

6. The method of claim 5, wherein the step of requesting network association is initiated, by a user, by providing one user action.

7. The method of claim 6, wherein the step of requesting network association further comprises detecting a set of available networks with which the first device may be associated.

8. The method of claim 5, wherein the step of authenticating the first device is initiated, by a user, by providing one user action.

9. The method of claim 5 wherein the second device is a central coordinator.

10. A device configured to be operably coupled to a network, the device comprising:
 a key module configured to determine one or more keys;
 an encryption/decryption module configured to encrypt and decrypt messages in the network;
 a communication module configured to:
  establish a secure channel with at least one station, wherein the secure channel is established by exchanging a first key and a second key, wherein the first key, the second key, or both the first key and the second key, are determined by the key module, wherein the first key is an unencrypted public key, and wherein the second key is a public key encrypted by the encryption/decryption module using a received first public key, and wherein the encrypted second public key is exchanged within two or more scheduled time slots, wherein the two or more time slots are time intervals that are reserved by the network, and by exchanging a third public key, wherein the third public key is encrypted using the encrypted second public key, and wherein the third public key is based on determining a presence of a state of contention for the encrypted second public key by detecting a plurality of received transmissions for the encrypted second public key exchanged during a contention free scheduled two or more time slots that follow the determined presence of a state of contention, wherein one or more received transmissions of the plurality of received transmissions is received from a device other than the device and the at least one station, thereby providing both the device and the at least one station with a third public key for subsequent encrypted communications for secure channel communication; and a network scheduling module configured to:
  schedule the one or more scheduled time slots to at least one station in the network, including in response to hearing a request for one or more keys;
  transmit beacons controlling activities in the network including at least one beacon indicating the scheduled two or more time slots.

11. The device of claim 10 further comprising:
 an association module configured to request association with the network.

12. The device of claim 10 further comprising:
 an authentication module configured to grant or reject association with the network.

13. The device of claim 12, wherein the authentication module is further configured to send a set of network credentials.

14. A system comprising:
 a first device configured to:
  send a first key associated with the first device wherein the first key is an unencrypted public key; and
  request a second public key associated with a second device;
 the second device configured to:
  encrypt a public key based on the received first public key of the first device; and
  broadcast a schedule of two or more time slots allocated for sending the requested second public key, wherein the two or more time slots are time intervals that are reserved by the network;
  send the encrypted public key as a second public key within a scheduled two or more time slots allocated for the second device to send the second public key; and
  receive a third public key from the first device, wherein the received third public key is encrypted using the second public key based on determining a presence of a state of contention for the encrypted second public key by detecting a plurality of received transmissions, by the first device, of the encrypted public key as a second public key sent by the second device during a contention free scheduled two or more time slots that follow the determined presence of a state of contention, wherein one or more received transmissions of the plurality of received transmissions is received from a device other than the second device; and
 a network operably coupled to the first device and the second device.

15. The system of claim 14, wherein the first device is further configured to
 receive and decrypt the encrypted second public key using a private key associated with the first public key.

16. The system of claim 15, wherein the first device is further configured to send the third public key encrypted using the second public key.

17. The system of claim 16 wherein the second device is further configured to decrypt the encrypted third public key using the second public key thereby providing both the first device and the second device with the third public key for subsequent encrypted communications for a secure channel communication.

18. The system of claim 14 wherein the system is further configured to permit the first device to receive the encrypted second public key if neither the scheduled two or more time slots are jammed nor an authorized user collision with the sent encrypted second key occurs within the scheduled two or more time slots.

19. The method of claim 1 wherein the at least one beacon comprises one or more regions.

20. The method of claim 19 wherein the one or more regions comprise two or more time slots.

21. The method of claim 3 further comprising:
authenticating the first device within the network, based on the received third public key, wherein the authenticating step comprises providing a set of network credentials comprising a network encryption key and a network authentication key via the established secure channel.

22. The method of claim 21 wherein the third public key is newly generated.

23. The method of claim 21 wherein the third public key is previously generated and retrieved after receiving, by the first device, the encrypted second key.

24. The method of claim 21 wherein the secure channel between the first device and the second device in the network is established based on the third public key.

25. The method of claim 21 further comprising the step of sending the third public key, by the first device, at the scheduled two or more time slots.

26. The method of claim 10 wherein the transmitted at least one beacon comprises one or more regions.

27. The method of claim 26 wherein the one or more regions comprise two or more time slots.

28. A method comprising:
encrypting, by a central coordinator (CCO), a first public key associated with the CCO based on a received first station (STA) key, the first STA key associated with an STA, wherein the encrypting is based on a received request from the STA for the first public key of the CCO;
transmitting, by the CCO, the encrypted CCO first public key during a scheduled two or more time slots for transmitting the encrypted CCO first public key, wherein the scheduled two or more time slots are based on a broadcasted two or more time slots by the CCO and wherein the two or more time slots are time intervals that are reserved by the CCO;
determining, by the STA, a presence of a state of contention by detecting a plurality of received transmissions at the scheduled two or more time slots, wherein one or more received transmissions of the plurality of received transmissions is received from a device other than the CCO;
determining a second STA public key encrypted by the STA using the encrypted CCO first public key, wherein the second STA public key is based on the determined presence of a state of contention for the encrypted CCO first public key; and
exchanging keys during a contention free scheduled two or more time slots that follow the determined presence of a state of contention at the scheduled two or more time slots.

29. The method of claim 28 wherein the received request from the STA for the first public key of the CCO is received during a contention free period, wherein the contention free period occurs when only stations or devices that have explicit authorization from the CCO are allowed to transmit.

30. The method of claim 28 wherein the exchanging of keys is based on the STA listening for encrypted messages at the scheduled two or more time slots.

31. The method of claim 28 wherein the presence of a state of contention is further based on determining if two or more stations are contending for the scheduled two or more time slots.

32. The method of claim 28 further comprising:
sending, by the STA, the generated second STA public key to the CCO, wherein the second STA public key is encrypted based on the decrypted first public key of the CCO transmitted during the scheduled two or more time slots.

33. The method of claim 28 further comprising:
gathering, by the CCO, statistics associated with the state of contention; and
sending, a set of messages based on the gathered statistics, wherein the set of messages comprises information about the presence of a contention state.

* * * * *